United States Patent Office 3,486,566
Patented Dec. 30, 1969

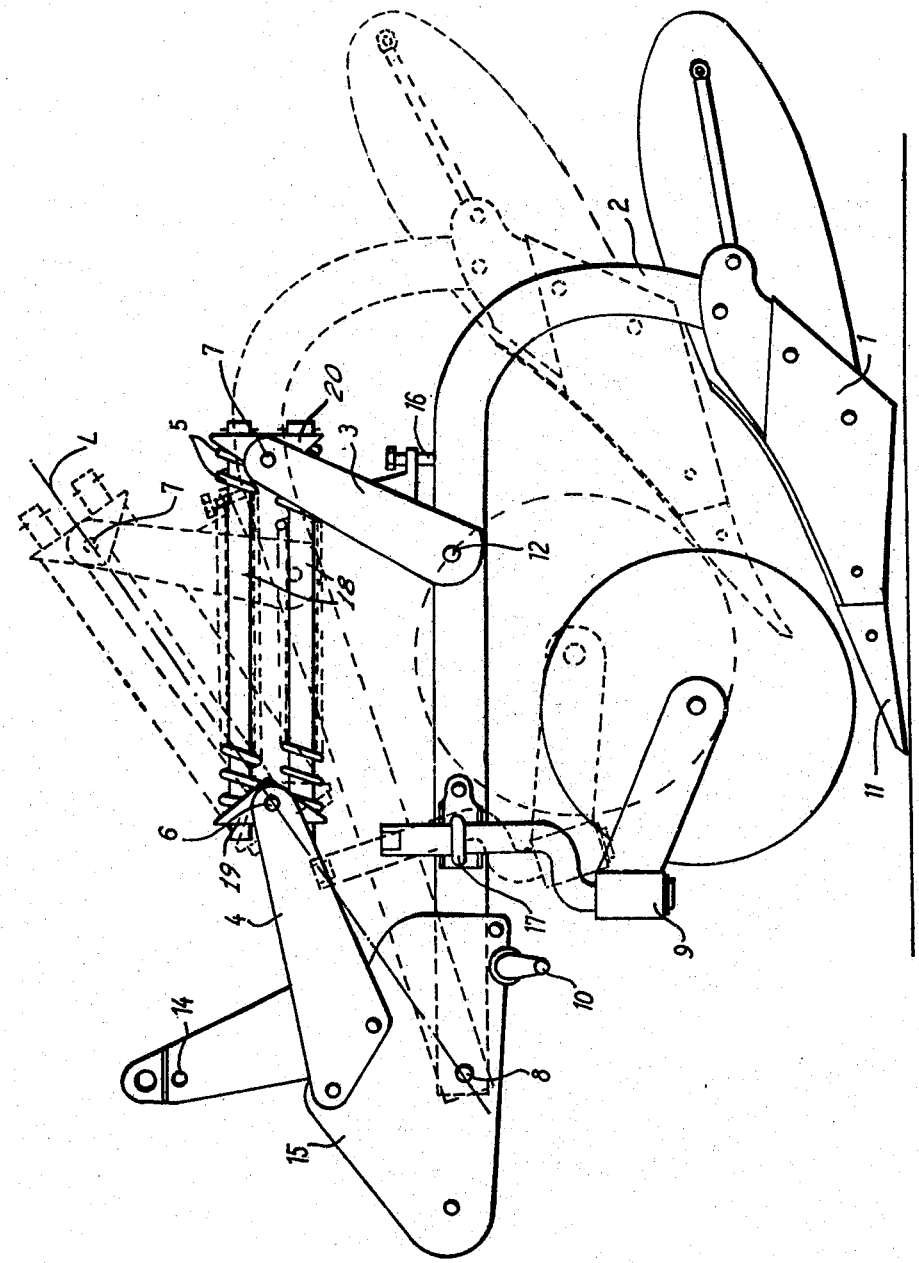

3,486,566
STONE RELEASE ON TRACTOR PLOUGH
Olav Njå, Kvernaland, Norway, assignor to Kvernelands
Fabrikk A/S, Kvernaland, Norway
Filed Nov. 29, 1966, Ser. No. 597,626
Claims priority, application Norway, Dec. 9, 1965,
160,842
Int. Cl. A01b 61/00, 35/20
U.S. Cl. 172—265
1 Claim

ABSTRACT OF THE DISCLOSURE

A pivotally mounted plough beam structure is arranged to swing upward against the counter-action of an over-centre spring mechanism in the event that the plough strikes an obstacle. When the plough beam passes, a raised position corresponding to the neutral position of the over-centre spring mechanism, the direction of the spring force reverses and provides some assist action aiding further upward angular movement of the plough beam by counter-balancing a part of the overall weight of the plough structure which always tends to lower it to the working position.

---

When ploughing in stony ground, tractor ploughs are used with stone releases. Stone releases comprise usually a spring mechanism which seeks to hold the plough in the working position and which can give way in a resilient manner when the plough strikes an obstacle in the field with the result that the plough is brought somewhat out of its normal position.

Tractor ploughs with stone releases can be divided into two groups, namely tractor ploughs in which the plough on striking an obstacle swings up and remains in the released position until one again brings the plough down into the working position, for example by backing the tractor, whilst the other type of plough has a spring mechanism which the whole time seeks to hold the plough in the working position.

The disadvantage of the first of the two above mentioned types is that one must carry out special actions or manual operations in order to bring the plough back into the working position, whilst the disadvantage of the second type of tractor plough is that the force which the spring mechanism exerts steadily increases with the increasing angular movement of the plough, that is to say that the spring force is greatest for the greatest obstacles when the spring force, out of consideration to the plough, should have become less. This invention relates to an improvement to stone releases through which the advantages of both types of tractor ploughs are brought together in that the force which seeks to bring the plough back to the working position does not increase unreasonably with large obstacles and furthermore the plough will automatically seek back into the working position when the obstacle has been passed.

There are several methods of solving this problem, but in accordance with the invention, the spring mechanism is so arranged that it exerts an increasing spring force on the plough beam during the first part of its swinging movement, and thereafter a force which becomes less or which works in the opposite direction.

An expedient design of a spring mechanism of this type consists of an "over centre" mechanism which swings simultaneously with the swinging of the plough beam and which, until the "over centre" position has been reached, exerts a force which is so directed that it seeks to bring the plough beam downwards, in addition to its own weight, whilst the "over centre" position will exert an upward force which counter-balances a part of the weight of the plough beam and the plough body.

In the design mentioned, it is also expedient that the strength of the spring mechanism is so adjusted that the force which it exerts in the upper terminal position is less than the weight of the plough beam and the plough body.

An example of the invention will in the following be described in more detail with reference to the drawing, which shows a practical example of the invention.

In the drawing the plough body is indicated with 1, and this is fixed to the plough beam 2 which at 3 has arm connected to a spring mechanism which lies under compression between the arm 3 and a fixed bracket 4. Two helical springs 5 respectively surround a pair of parallel spaced rods 18 and the opposite ends of these springs bear against abutment plates 19, 20 which are mounted upon the rods 18. The abutment plate 19 is secured to bracket 4 by means of a pivotal connection 6, and the abutment plate 20 is secured to arm 3 by means of a pivotal connection 7. The abutment plate 19 remains in one position relative to the rods and springs but the other abutment plate 20 slides along the rods to compress the springs as the plough beam pivots upwardly. Plough beam 2 is pivoted at 8 in the suspension frame 15 which with three-point suspension 10 and 14 can be mounted behind a tractor with hydraulic lift. The arm 3 is pivoted at 12 to a connection point on the plough beam intermediate the ends thereof and the position of the arm in relationship to the plough beam 2 can be adjusted with an adjusting screw 16. The tractor plough shown has further, at 17, been fitted with a disc coulter 9 which may be moved up or down as required, and the coulter according to the invention, is fitted to the plough beam 2 in such a way that it will move together with this when an obstacle is struck.

The spring mechanism 5, 6, 7 forms a so-called "over centre" mechanism in which the springs, when the mechanism lies on the one side of a line between the centres which are of interest, exert a spring force in the one direction and a spring force in the other direction when the mechanism lies on the other side of the line. This line goes, in the example shown, between points 6 and 8 which respectively are the pivoting points for the spring mechanism and for the plough beam, and the line is, in the drawing, marked with L. When now the point 11 of the plough body 1 strikes an obstacle in the field, it will, all according to the size of the obstacle, swing backwards and upwards about a fulcrum 8. Such an angular movement will compress the springs 5 in the spring mechanism and these will exert a weakly increasing downward-directed force which endeavours to bring the plough body back to the correct working position in the field. For comparatively small obstacles, an increasing force will be advantageous because the plough then will quickly return to the working position, and such an increasing force will result from a movement from the position shown with full lines in the drawing up to the position which is shown with broken lines. Here the springs 5 are at maximum compression in that the distance between the points 6 and 7 is the smallest possible, and the force the spring mechanism exerts in this position, which we may call the neutral position, is approximately nothing, and the force which seeks to swing the plough back into the working position is exerted by the weight of the plough. If the obstacles are so large that the plough is swung further up about point 8, the spring mechanism will swing over the line L and the force the mechanism then exerts on the plough is directed upwards. The spring force will then counterbalance a larger or smaller part of the weight of the plough, and the downward-directed resultant force will then decrease with further angular movement of the plough upwards on account of a very large obstacle. The spring force should however, be so adjusted that it does not fully counter-balance the weight of the plough in that such complete counter-balancing would result in the plough remaining in the elevated position and not seeking down into the working position. The spring force can be adjusted with the help of the screw 16 which, with the plough in the working position, will compress the springs 5 more or less.

Through this invention, one has thus arrived at an improvement in a stone release which enables the stone release to exert an evenly increasing, downward directed force on the plough when this strikes that which we could call normal obstacles in the field, whilst the downward directed force decreases in order to spare the plough when this, on account of unusually large obstacles, is moved or swung higher up than normal, whilst at the same time the plough maintains its ability automatically to seek back to the working position, and then with such spring forces as are necessary in order to allow the plough to work satisfactorily during ploughing.

I claim:
1. In a plough structure, the combination comprising a plough beam, first pivot means mounting one end of said plough beam on a support, the opposite end of said plough beam terminating in a ground engaging plough, a rod assembly comprising pair of parallel spaced rods around which helical compression springs are placed and guided during compression, second pivot means connecting one end of said rod assembly to said plough beam support, an arm member, third pivot means connecting one end of said arm member to said plough beam intermediate the ends thereof, and fourth pivot means connecting the other end of said arm to a spring-compressing member slidable on said rod assembly from the opposite end thereof and engaging the corresponding ends of said springs, the initial upward pivotal movement of said plough beam about said first pivot means from a ground working position being countered by a force from said springs as said springs are compressed on said rods by movement of said spring-compressing member as a result of upward pivotal movement of said rod assembly about said second pivot means, said spring force at first being progressively increased and then decreased to substantially zero when said first, second and fourth pivot means reach a position of alignment, and said spring force being thereafter reversed in direction as said plough beam continues its upward pivotal movement past said alignment position of said pivot means to thereby provide an assist action aiding upward movement of said plough beam.

References Cited

UNITED STATES PATENTS

| 839,956 | 1/1907 | Reeves et al. | 172—266 |
| 2,906,353 | 9/1959 | Rogers | 172—265 |

FOREIGN PATENTS

| 138,315 | 7/1949 | Sweden. |

ROBERT E. PULFREY, Primary Examiner

J. W. PETERSON, Assistant Examiner

U.S. Cl. X.R.

172—499, 705